(12) United States Patent
Shirai et al.

(10) Patent No.: US 6,184,533 B1
(45) Date of Patent: Feb. 6, 2001

(54) SCANNING PROBE MICROSCOPE WITH THE STAGE UNIT

(75) Inventors: Takashi Shirai, Tsukuba; Ken Murayama, Tsuchiura; Takafumi Morimoto, Kashiwa; Hiroshi Kuroda, Tsuchiura; Harumasa Onozato, Ohme, all of (JP)

(73) Assignee: Hitachi Construction Machinery Co., Ltd., Tokyo (JP)

( * ) Notice: Under 35 U.S.C. 154(b), the term of this patent shall be extended for 0 days.

(21) Appl. No.: 09/166,850

(22) Filed: Oct. 6, 1998

(30) Foreign Application Priority Data

Oct. 7, 1997 (JP) .................................................. 9-290325

(51) Int. Cl.⁷ .................................................. H01J 37/20
(52) U.S. Cl. .......................................... 250/442.11; 73/105
(58) Field of Search ........................ 250/442.11; 73/105; 33/567.1

(56) References Cited

U.S. PATENT DOCUMENTS

| 3,645,001 | * | 2/1972 | Bosworth et al. | 33/567.1 |
| 4,168,574 | | 9/1979 | Chase | 33/162 |
| 5,105,552 | * | 4/1992 | Bielle | 33/567.1 |
| 5,286,977 | | 2/1994 | Yokoyama et al. | 250/442.11 |
| 5,672,816 | | 9/1997 | Park et al. | 73/105 |

FOREIGN PATENT DOCUMENTS

| 0 252 174 | 1/1988 | (EP) . |
| 2 245 975 | 1/1992 | (GB) . |
| 89/02571 | 3/1989 | (WO) . |

OTHER PUBLICATIONS

Kleindiek, S. et al, "Miniature Three–Axis Micropositioner for Scanning Proximal Probe and Other Applications," Journal of Vacuum Science and Technology: Part B, vol. 13, No. 6, Nov. 1, 1995, pp. 2653–2656.

* cited by examiner

*Primary Examiner*—Jack Berman
(74) *Attorney, Agent, or Firm*—Mattingly, Stanger & Malur, P.C.

(57) ABSTRACT

A stage unit used for moving a sample comprises a vertical stage for moving a sample stand in a vertical direction, a horizontal stage for moving the vertical stage in a horizontal direction. In the stage unit, the horizontal stage is fixed on a horizontal slide surface of a surface table and the vertical stage is slidably arranged on the slide surface. The vertical stage is coupled with the horizontal stage by means of plate springs having strong rigidity in the horizontal direction and weak rigidity in the vertical direction. The whole rigidity of the stage unit is determined only by the vertical stage and is not subject to the effect of the rigidity of the sections included in the horizontal stage and the rigidity of a driving section as to each axis direction. The rigidity of the stage unit can be increased. The standstill rigidity of the stage unit is determined only by the rigidity of the vertical stage. All stages of the stage unit are not piled up. Therefore the height of stage unit can be decreased as low as possible.

16 Claims, 10 Drawing Sheets

SCANNING PROBE MICROSCOPE WITH THE STAGE UNIT

BACKGROUND OF THE INVENTION

1. Field of the Invention

The present invention relates to a movement stage unit used for moving a sample or positioning it at a predetermined place, and a scanning probe microscope equipped with the movement stage unit.

2. Description of the Related Art

A scanning probe microscope has high resolution capable of measuring or observing fine objects substantially equal to a size of atoms or molecules. In the scanning probe microscope, a measuring and observing section including a detecting section observes a sample like a wafer mounted on a sample stand.

A typical sample stage mechanism used in the conventional scanning probe microscope is shown in FIG. 10, for example. This sample stage mechanism is configured by an X-axis direction stage 901, a Y-axis direction stage 902 and a Z-axis direction stage 903, which are piled up so as to make a triple structure. The sample stage mechanism is placed on a surface table 904. The Z-axis direction stage 904 is equipped with a sample stand 905, on which a sample 906 such as a wafer and the like is mounted. A probe tip 907 for measuring a sample surface is arranged above the sample 906. The probe tip 907 is disposed to a frame fixed on the surface table 905. When each of the X-axis direction stage 901, the Y-axis direction stage 902 and the Z-axis direction stage 903 operates individually, the sample 906 mounted on the sample stand 905 can be moved toward any place. The probe tip 907 scans the surface of the sample 906 based on a change of the relative positional relationship between the sample 906 and the probe tip 907.

For the scanning probe microscope, in general, it is preferable to fail to transmit external vibrations into the sample. Therefore, it is desirable to increase the rigidity of the middle structure from the probe tip 907 to the sample 906. However, in the conventional scanning probe microscope with the sample stage mechanism having the aforementioned triple structure, the entire rigidity of the sample stage mechanism is determined by the structure formed out of combining the X-axis direction stage, the Y-axis direction stage and the Z-axis direction stage in series. This structure of the series combination results in a lowering of the entire rigidity because each rigidity of the three stages are added. Further, since the three stages piled-up structure increases the entire height of the sample stage mechanism, the shape of the frame 908 increases in its size, and therefore the rigidity of the frame 908 is reduced.

As a prior art literature stating the art for increasing the rigidity of the structural section from a detecting section to the sample in the sample stage mechanism of the scanning probe microscope, the publication of Tokko-Hei (Patent) No.1-34746 can be cited. The apparatus stated in the literature is adapted to reduce the structure of movable sections in its size as small as possible and to directly drive the movable sections by driving sections. However, since the driving section in the movable section operates based on the direct driving system and the point end of the driving section has functions of driving and supporting, the apparatus of the prior art poses a problem that the rigidity of the sample stage mechanism is determined by the rigidity of the driving sections. To say concretely, each rigidity of steel balls, floating pads, nut members, feeding screws have an effect on the entire rigidity based on their series relationship. In addition, the structure for the direct driving increases the height of the sample stage mechanism.

SUMMARY OF THE INVENTION

The object of the present invention is to provide a stage unit used for moving a sample, in which its whole rigidity is increased and its height is decreased as low as possible and further the rigidity of driving sections thereof have few effect to the whole rigidity.

Another object of the present invention is to provide a scanning probe microscope having the stage unit.

The stage unit of the present invention is configured as follows in order to achieve the above-mentioned objects.

The stage unit used for moving a sample in accordance with the present invention comprises, if it is arranged on a horizontal surface table, a vertical stage (Z-axis direction stage) for moving a sample stand upward and downward in a vertical direction, a horizontal stage (X-axis and Y-axis direction stages) for moving the vertical stage in a horizontal direction. The stage unit is fixed to a horizontal slide surface of the surface table. The horizontal stage is fixed on the slide surface and the vertical stage is slidably arranged on the slide surface. The vertical stage is coupled with the horizontal stage by means of coupling members (for example, plate spring) having strong rigidity in the horizontal direction and weak rigidity in the vertical direction.

In accordance with the above configuration, the whole rigidity of the stage unit is determined only by the vertical stage and is not subject to the effect of the rigidity of the sections included in the horizontal stage and the rigidity of a driving section as to each axis direction. Consequently, the rigidity of the stage unit can be increased. Further, the standstill rigidity of the stage unit is determined only by the rigidity of the vertical stage. Since all stages of the stage unit are not piled up and further the height of stage unit is determined only by the vertical stage, the height of the stage unit can be lowered as low as possible, and therefore the height of a probe-tip-supporting frame arranged above the sample can be lowered.

The stage unit may have a wedges-combination mechanism operating as an ascent and descent mechanism in the vertical stage. The wedges-combination mechanism performs the upward and downward movement of the sample stand based on the horizontal movement operations of the slope thereof. The wedges-combination mechanism is capable of increasing the rigidity thereof and decreasing the height as the ascent and descent mechanism.

In the stage unit, the wedges-combination mechanism comprises an upper wedge member on which the sample stand is arranged, and a lower wedge member movable in the horizontal direction by a driving section. The upper and lower wedge members are placed so that their slopes face with each other.

In the stage unit, the horizontal stage comprises a first-axis (X-axis) direction stage and a second-axis (Y-axis) direction stage. The first-axis direction stage is fixed on the slide surface of the surface table. The second-axis direction stage is arranged on the first-axis direction stage so as to be movable by a rail guide mechanism and has a moving frame which is movable by another rail guide mechanism. In this case, the vertical stage is coupled with the moving frame by means of the coupling members.

In the stage unit, further, the horizontal stage comprises a first-axis (X-axis) direction stage and a second-axis (Y-axis) direction stage, and the first-axis direction stage is fixed on the slide surface of the surface table, and further the second-axis direction stage is placed in an inside space of the first-axis direction stage so as to be slidable on the slide surface. In this case, the vertical stage is placed in an inside space of the second-axis direction stage so as to be slidable on the slide surface of the surface table.

In the stage unit, a bottom plate of the vertical stage may have an air-emitting mechanism which emits an air through nozzles formed on a lower surface of the bottom plate. This configuration enables the vertical stage to move smoothly on the slide surface of the surface table without having friction.

Further, the scanning probe microscope of the present invention is provided with the above-mentioned stage unit and a detecting section including a probe tip directed to a sample mounted on the sample stand. This scanning probe microscope observes the sample by causing the probe tip to scan the sample surface in accordance with the movement of the sample by means of the stage unit, while detecting a specific physical amount generated between the probe tip and the sample.

BRIEF DESCRIPTIONS OF THE DRAWINGS

DESCRIPTION OF THE PREFERRED EMBODIMENTS

Figure 1:
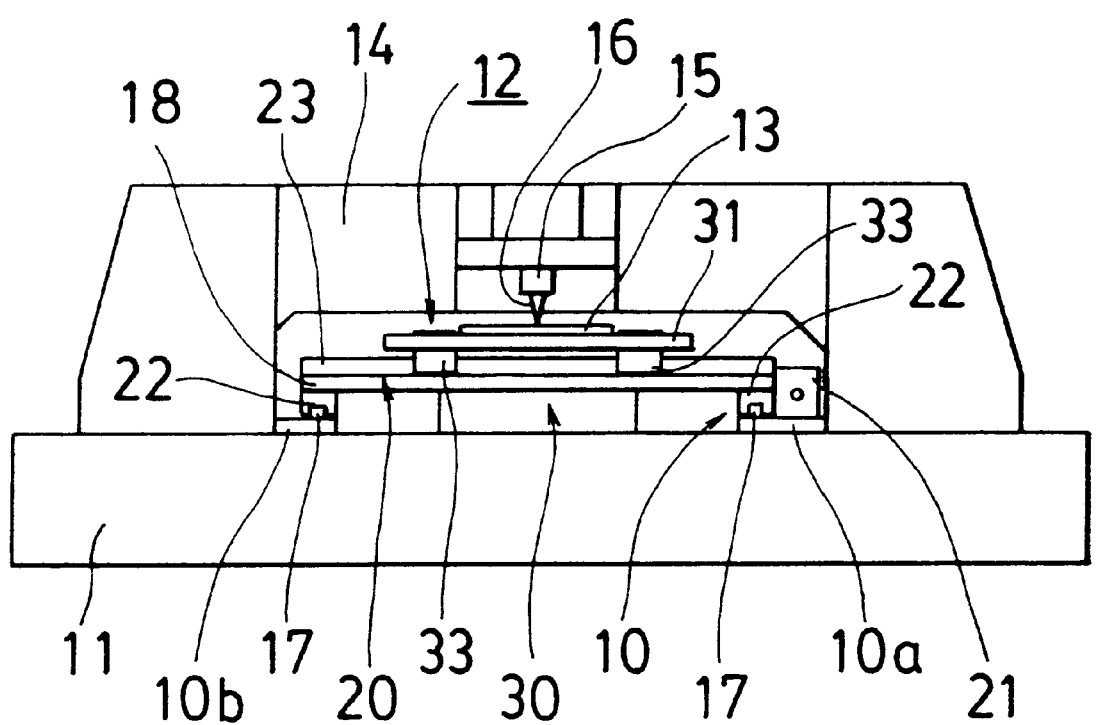
FIG. 1 is a side view showing the first embodiment of a movement stage unit of the present invention.

Hereinafter preferred embodiments of the present invention will be explained with reference to the accompanying drawings. In the first place, by referring to FIGS. 1–6, the first embodiment of the present invention will be explained.

A reference numeral 12 denotes a movement stage unit of the first embodiment. This movement stage unit 12 is placed on an upper surface of a surface table 11. The upper surface of the surface table 11 is preferably parallel to a horizontal surface (X and Y directions) and forms a precise slide surface. The movement stage unit 12 comprises an X-axis direction stage 10, a Y-axis direction stage 20 and a Z-axis direction stage 30. The X-axis direction stage 10 carries out an X-axis direction movement and the Y-axis direction stage 20 carries out a Y-axis direction movement. These X-axis direction and Y-axis direction stages 10 and 20 compose a horizontal stage. The Z-axis direction stage 30 carries out a movement in the vertical direction (Z-axis direction) and functions as a vertical stage. A sample stand 13 is attached to the Z-axis direction stage 30. A sample such as a wafer is mounted on the sample stand 13. The sample is placed at the highest position in the movement stage unit 12.

A frame 14 fixed on the surface table 11 is arranged over the movement stage unit 12. The frame 14 is not limited to that shown in FIG. 1 and is capable of having any shape. The frame 14 has a detecting section 15 at about the central position, which is disposed above the sample. The detecting section 15 includes a probe tip 16 whose pointed end is directed toward an upper surface of the sample. The movement stage unit 12 moves the sample in all directions of X-axis, Y-axis and Z-axis and thereby a change in a relative positional relationship between the probe tip and the moving sample causes the probe tip 16 to scan the surface of the sample so that the sample surface can be measured and observed. The mechanism including the movement stage unit 12 shown in FIG. 1 composes a scanning probe microscope.

Figure 2:
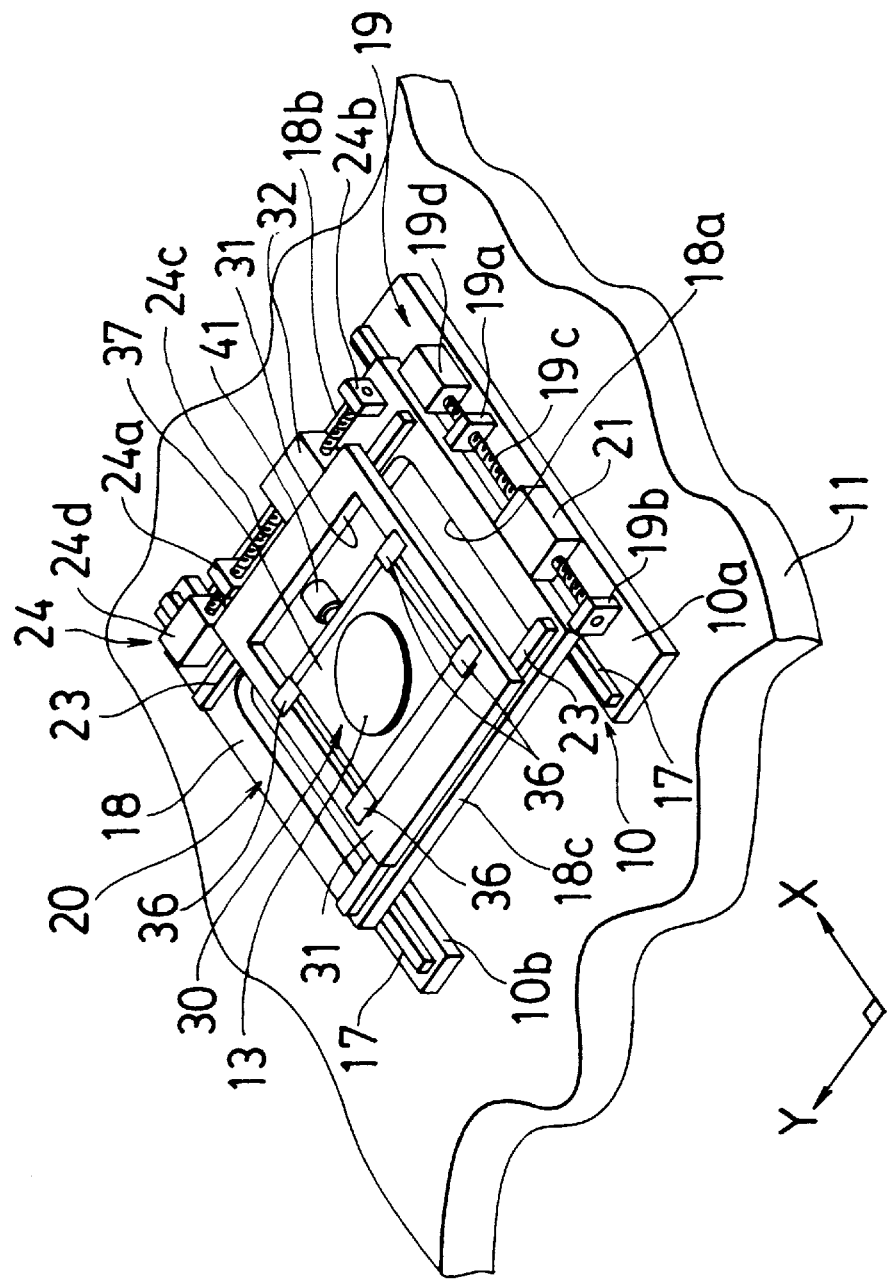
FIG. 2 is a perspective diagram showing the outside appearance of the stage unit of the first embodiment.
Figure 3:
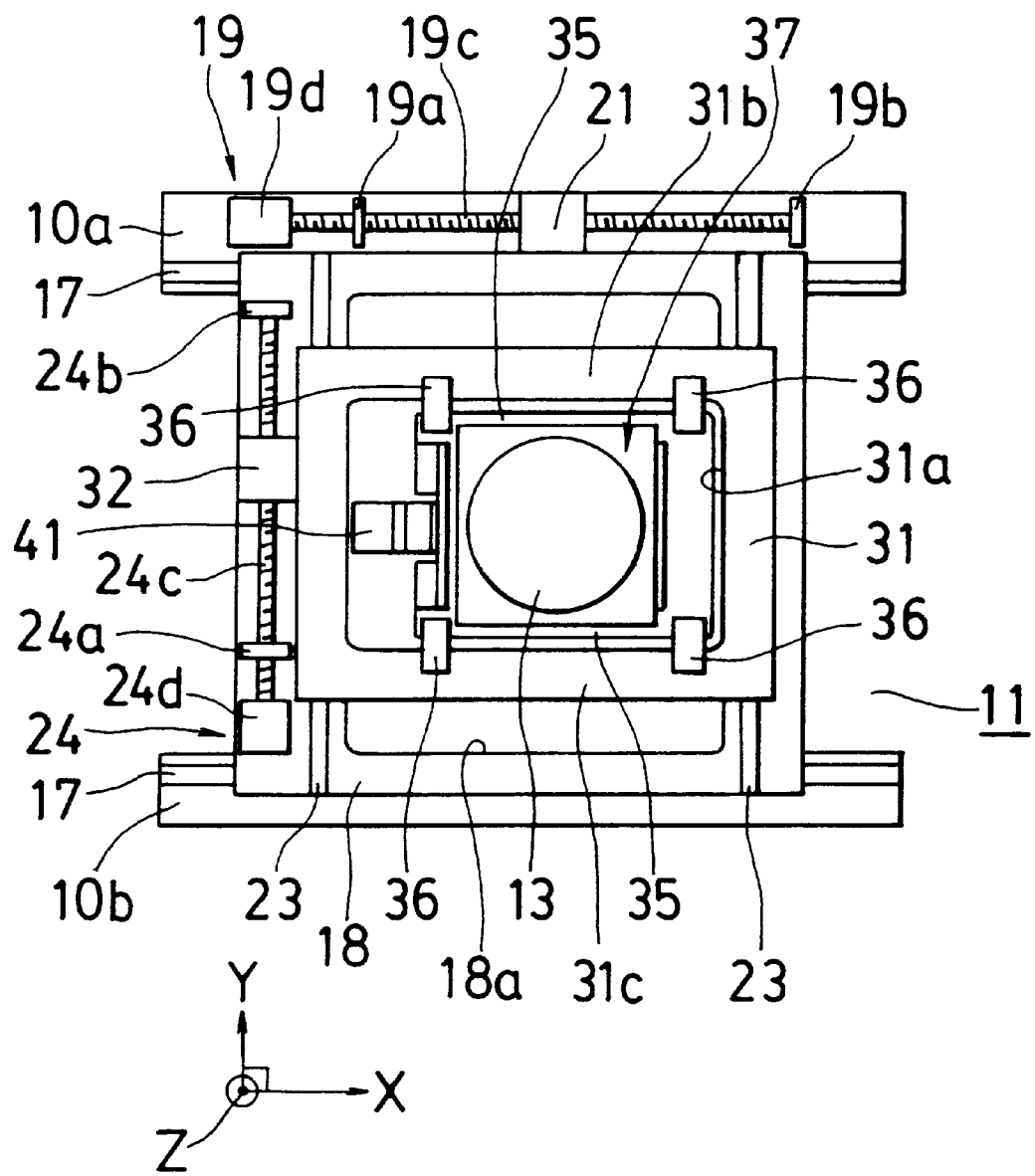
FIG. 3 is a plan view showing the stage unit of the first embodiment.

As shown in FIG. 2, the X-axis direction stage 10 includes two parallel X-axis frames 10a and 10b fixed on the surface table 11. A rail 17 is arranged on each upper surface of the two X-axis frames 10a and 10b. A Y-axis frame 18 is placed on the two rails 17 so as to span the space between the two rails and be movable in the X-axis direction. In the X-axis direction stage 10, an X-axis direction driving section 19 is arranged on the X-axis frame 10a having a wide width. The X-axis direction driving section 19 includes two supporting plates 19a and 19b, a rotating shaft 19c supported rotatably by the two supporting plates, and a motor 19d rotating the rotating shaft 19c. The rotating shaft 19c has a male screw on its surface, with which a coupling section 21 arranged in the side of the Y-axis frame 18 is engaged. The coupling section 21 has a threaded hole. When the rotating shaft 19c rotates, the coupling section 21 moves along the rotating shaft 19c in response to the rotating direction of the rotating shaft 19c and further the Y-axis frame 18 united with the coupling section 21 is also moved together. The aforementioned X-axis direction stage 10 can move the Y-axis frame 18 and the sections related to this frame, that is, the Y-axis direction stage 20 and the Z-axis direction stage 30, in the X-axis direction.

The Y-axis direction stage 20 has the above-mentioned Y-axis frame 18. The whole shape of the Y-axis frame 18 is a four-sided figure and the Y-axis frame 18 has a opening 18a of a rectangular shape. Side sections 18b and 18c of the Y-axis frame 18, each of which is perpendicular to the X-axis frames 10a and 10b, has a length of being sufficient to be laid across between the two rails 17 of the X-axis frames. Further, rail receiving sections 22 which come in contact with the rails 17 are arranged under side sections of the Y-axis frame 18, each of which is parallel to the X-axis frames. The rail receiving section 22 slides on the rail 17 to move in the direction parallel to the rail 17. Further, rails 23 are respectively arranged on the upper surfaces of the side sections 18b and 18c of the Y-axis frame 18.

A moving frame 31 is placed on the two rails 23 so as to span the space between them and be movable in the Y-axis direction. A Y-axis direction driving section 24 is arranged on the upper surface of the side section 18b having the wide width. The Y-axis direction driving section 24 includes two supporting plates 24a and 24b, a rotating shaft 24c supported rotatably by the two supporting plates, and a motor 24d rotating the rotating shaft 24c. The rotating shaft 24c is threaded and is engaged with a coupling section 32 arranged on the side section of the aforementioned moving frame 31. This coupling section 32 has a threaded hole. When the rotating shaft 24c rotates, the coupling section 32 moves along the rotating shaft 24c in response to its rotating direction, and further the moving frame 31 united with the coupling section moves together. Thus, the Y-axis direction stage 20 can move the moving frame 31 and the related sections or the Z-axis direction stage 30 in the Y-axis direction.

The Z-axis direction stage 30 is coupled to the moving frame 31 through the upper section thereof. The moving frame 31 has a four-sided figure and a rectangular opening 31*a*. A body (a wedges-combination mechanism and the like described later) of the Z-axis direction stage 30 is arranged in the space formed by the opening 31*a*. Side sections 31*b* and 31*c* of the moving frame 31, each of which is perpendicular to the above-mentioned rail 23, has enough length to be laid across the space between the two rails 23 of the Y-axis frame 18. A rail receiving sections 33 which come in contact with the rails 23 are respectively arranged under two other side sections of the moving frame 31 parallel to the rail 23. The rail receiving section 33 slides on the rail 23 to move in the Y-axis direction.

Figure 4:
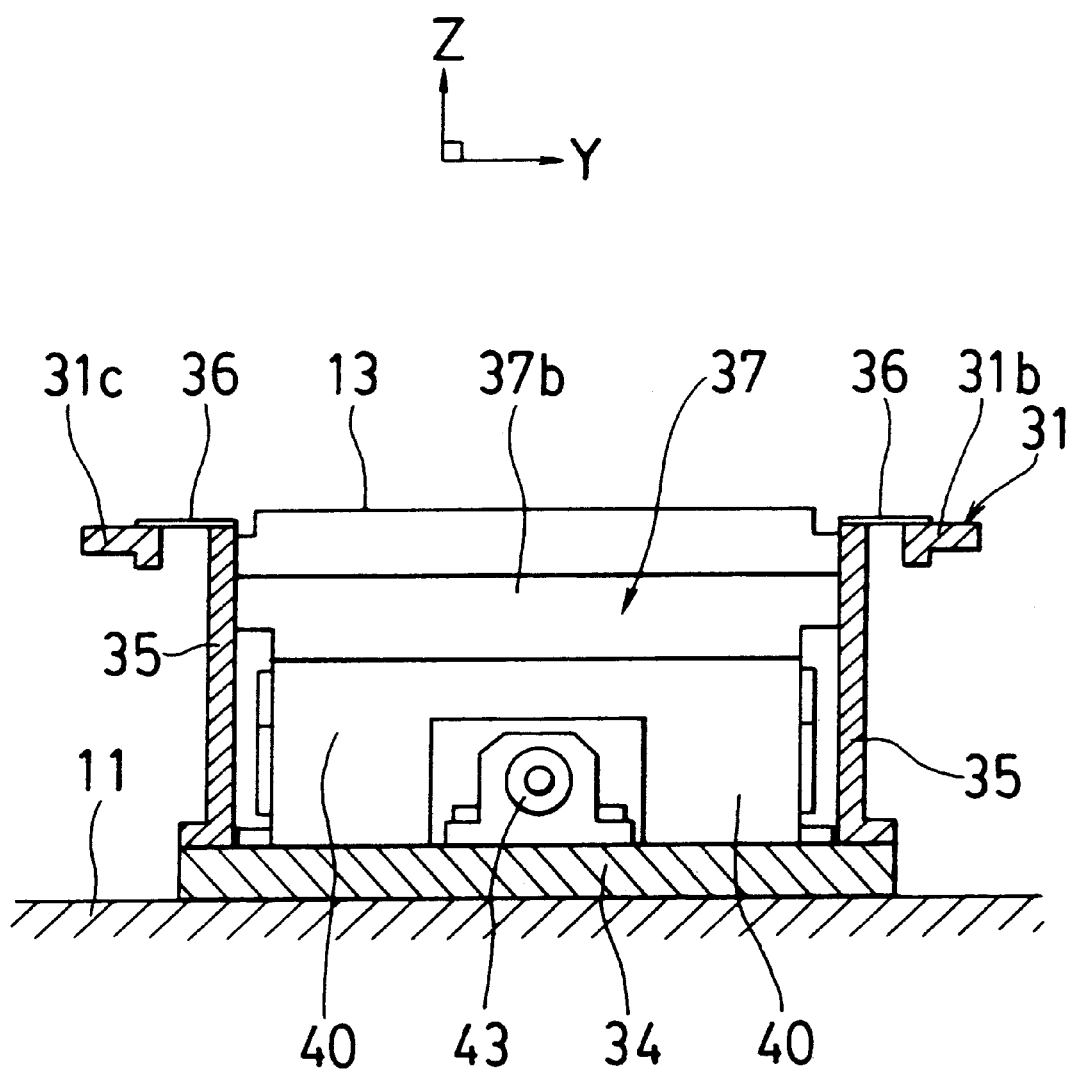
FIG. 4 is a front view showing a main section of a Z-axis direction stage.
Figure 5:
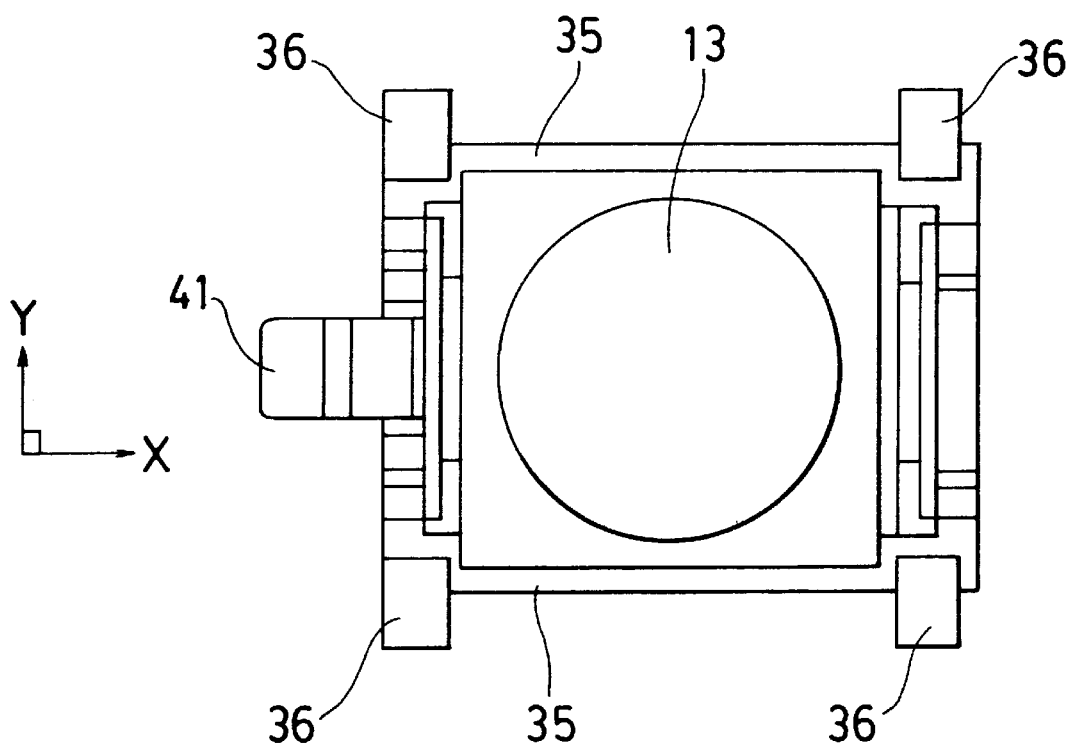
FIG. 5 is a plan view showing the Z-axis direction stage.
Figure 6:
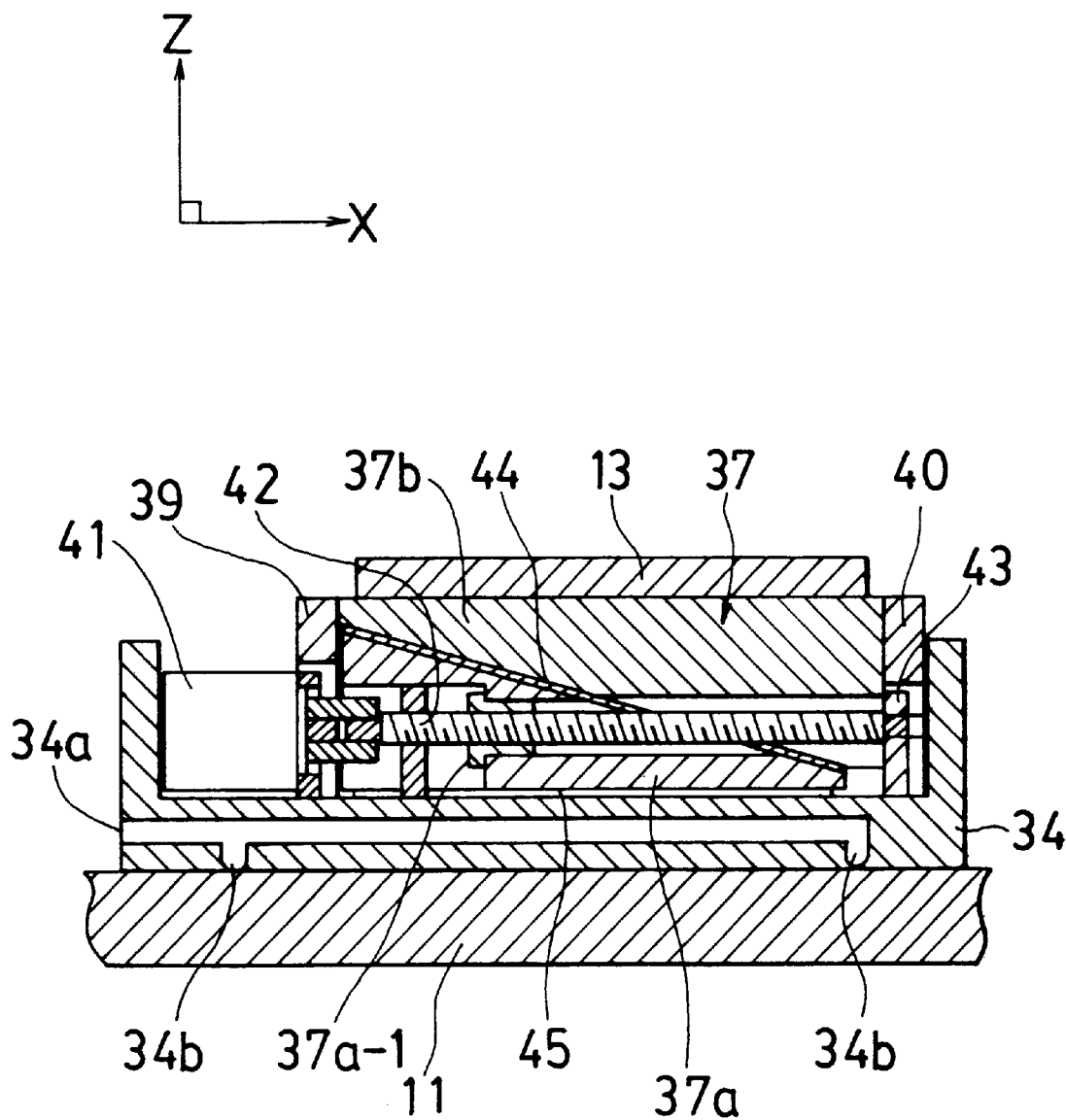
FIG. 6 is a side view showing a main section of the Z-axis direction stage.

As shown in FIGS. 4–6, the body of the Z-axis direction stage 30 comprises a bottom plate 34 slidably placed on the surface table 11, and two right and left Z-axis frames 35 fixed to side sections of the bottom plate 34. Each of the two Z-axis frames 35 is coupled to the moving frame 31 through plate springs 36 at two spots. This plate spring 36 is a rectangular plate-shaped spring member having a required area. All of the plate springs 36 are kept to be substantially horizontal and has flexibility in the vertical direction (Z-axis direction), while they have necessary high rigidity in the X-axis and Y-axis directions. When each of the X-axis and Y-axis direction stages 10 and 20 operates, the Z-axis direction stage 30 including the bottom plate 34 and the Z-axis frame 35, which is coupled to the moving frame 31 through the four plate springs 36, moves in the X-axis and Y-axis directions (the horizontal direction) on the surface table 11.

Figure 7:
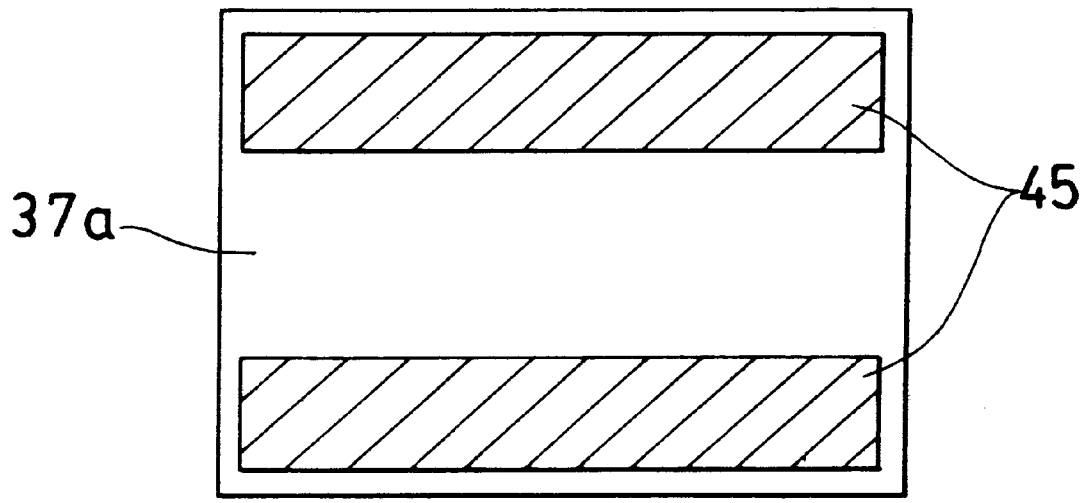
FIG. 7 is a bottom view of a lower wedge member in a wedges-combination mechanism.

In the body of the Z-axis direction stage 30, a wedges-combination mechanism 37 carrying out a movement in the vertical direction (Z-axis direction) as an ascent and descent mechanism is arranged on the bottom plate 34. The wedges-combination mechanism 37 comprises a lower wedge member 37*a* and an upper wedge member 37*b* and these two wedge members are combined to have a specific positional relationship so that their slopes face with each other. A slidable middle member 44 is placed between the two slopes and slidably comes in contact with them. The sample stand 13 is arranged on the upper surface of the upper wedge member 37*b*. The above-mentioned right and left Z-axis frame 35, a front frame 39 and a rear frame 40 are arranged around the wedges-combination mechanism 37. The wedges-combination mechanism 37 is surrounded by these frames 35, 39 and 40 at surrounding four sides. The shape of the upper wedge member 37*b* in the wedges-combination mechanism 37, as shown in a plan view, is substantially identical to the shape of the four-sided space formed by the frames 35, 39 and 40. Within this four-sided space, the upper wedge member 37*b* is allowed to move (or slide) only in the vertical direction and is limited not to move in the horizontal direction (the X-axis and Y-axis directions), because guide rails (not shown in the figures) enabling a slide movement only in the Z-axis direction are arranged between the wedges-combination mechanism 37 and each of the front frame 39 and the rear frame 40. Further the shape of the lower wedge number 37*a* is similar to that of the upper wedge member 37*b* and is formed so that its length in the X-axis direction is shorter than the distance between the front frame 39 and the rear frame 40. Accordingly, the lower wedge member 37*a* is movable (or slidable) in the X-axis direction in the space between the front frame 39 and the rear frame 40. Further the lower wedge member 37*a* is slidably placed on the bottom plate 34 through a slidable middle member 45. This slidable middle member 45 has a form of a thin plate or a sheet. As shown in FIG. 7, for example, two pieces of the slidable middle member 45 are attached on the base of the lower wedge member 37*a*.

The wedges-combination mechanism 37 has a motor 41 in the outside of the front frame 39. A driving shaft 42 of the motor 41 is threaded and an end thereof is rotatably supported by a supporting plate 43. The male screw (thread) formed in the driving shaft 42 is engaged with a female screw (a nut) 37*a*-1 fixed to the inside of the lower wedge member 37*a*. When the motor 41 operates to rotate the driving shaft 42, the lower wedge member 37*a* moves in the X-axis direction in response to the rotating direction of the driving shaft 42. When the lower wedge member 37*a* moves in the X-axis direction, the upper wedge member 37*b* moves in the vertical direction in response to the positional relationship between the two wedge members 37*a* and 37*b* on the basis of the peculiar operation of the wedges-combination mechanism 37. To describe the operations concretely by referring to FIG. 6, the upper wedge member 37*b* moves downward when the lower wedge member 37*a* moves toward the left side, while the upper wedge member 37*b* moves upward when the lower wedge member 37*a* moves toward the right side because the upper wedge member is pushed up by the slope of the lower wedge member.

As mentioned above, the movement stage unit according to the first embodiment, which is configured by the X-axis direction stage 10, the Y-axis direction stage 20 and the Z-axis direction stage 30, is capable of moving the sample stand 13 arranged on the Z-axis direction stage 30 in each direction of X-axis, Y-axis and Z-axis. When the sample stand 13 moves, the sample placed on the sample stand also moves.

In the movement stage unit 12, the body of the Z-axis direction stage 30 with the sample stand 13 is kept to be slidable (movable by sliding smoothly) on the surface table 11, the whole of the Z-axis direction stage 30 can be moved in the X-axis and Y-axis directions respectively by the X-axis direction stage 10 and the Y-axis direction stage 20. In accordance with the structure of this movement stage unit, the Y-axis direction stage 20 is piled on the X-axis direction stage 10, and the Z-axis frame 35 of the Z-axis direction stage 30 is coupled to the moving frame 31 arranged to be movable on the Y-axis direction stage 20. The plate springs 36 are used for coupling the Z-axis frame 35 with the moving frame 31. Thus, the structure formed by the sections from the X-axis direction section 10 to the sample stand 13 is not a series coupling structure. In addition to this feature, the wedges-combination mechanism 37 is used as the ascent and descent mechanism for the Z-axis direction stage 30. Therefore, the rigidity of the structure from the X-axis direction stage 10 to the sample stand 13 can be increased. In addition, the height of the sample stand 13 can be decreased as low as possible, since the distance from the surface table 11 to the sample stand 13, that is, the height of the movement stage unit 12 is determined by the body of the Z-axis direction stage 30, and the wedges-combination mechanism 37 is used as the ascent and descent mechanism.

When the Z-axis direction stage 30 is at a standstill, the sliding surfaces of the wedges-combination mechanism 37 and the bottom plate 34 come in contact with each other, and therefore a supporting structure in the vertical direction (Z-axis direction) is always formed. Further, as shown in FIG. 6, air holes (passages) 34a for causing a compressed air or a normal air to flow and nozzles 34b for emitting the air toward the surface table 11 are formed in the bottom plate 34 of the Z-axis direction stage 30. That is, the bottom plate 34 has an air-emitting mechanism which emits the air through the nozzles 34b formed in the lower surface thereof. The nozzles 34b are formed in a necessary number and necessary places in the lower surface in order to float the Z-axis direction stage 30 horizontally in well-balanced by the air. When the X-axis direction stage and the Y-axis direction stage move the X-axis and Y-axis directions respectively, the air-emitting mechanism raises the whole of the Z-axis direction stage 30 moving together with those stages by means of the air-emitting mechanism in order to slide smoothly on the surface table 11. The air-emitting mechanism operates to emit the air synchronously only when carrying out the movements in the directions of the X-axis and Y-axis. Consequently, in this case of the above-mentioned structure, the standstill rigidity of the Z-axis direction stage 30 is determined by the rigidity of the wedges-combination mechanism and the rigidity of each frame in the Z-axis direction stages.

In the above-mentioned embodiment, the number of the plate springs 36 used as the coupling member for coupling Z-axis frame 35 with the moving frame 31 moving on the Y-axis direction stage 20 is not limited to four. As the coupling member, instead of the plate spring 36, other members having a feature and a function substantially identical to those of the plate spring may be used. Further, the ascent and descent mechanism used in the Z-axis direction stage 30 is not limited to the wedges-combination mechanism 37.

Figure 8:
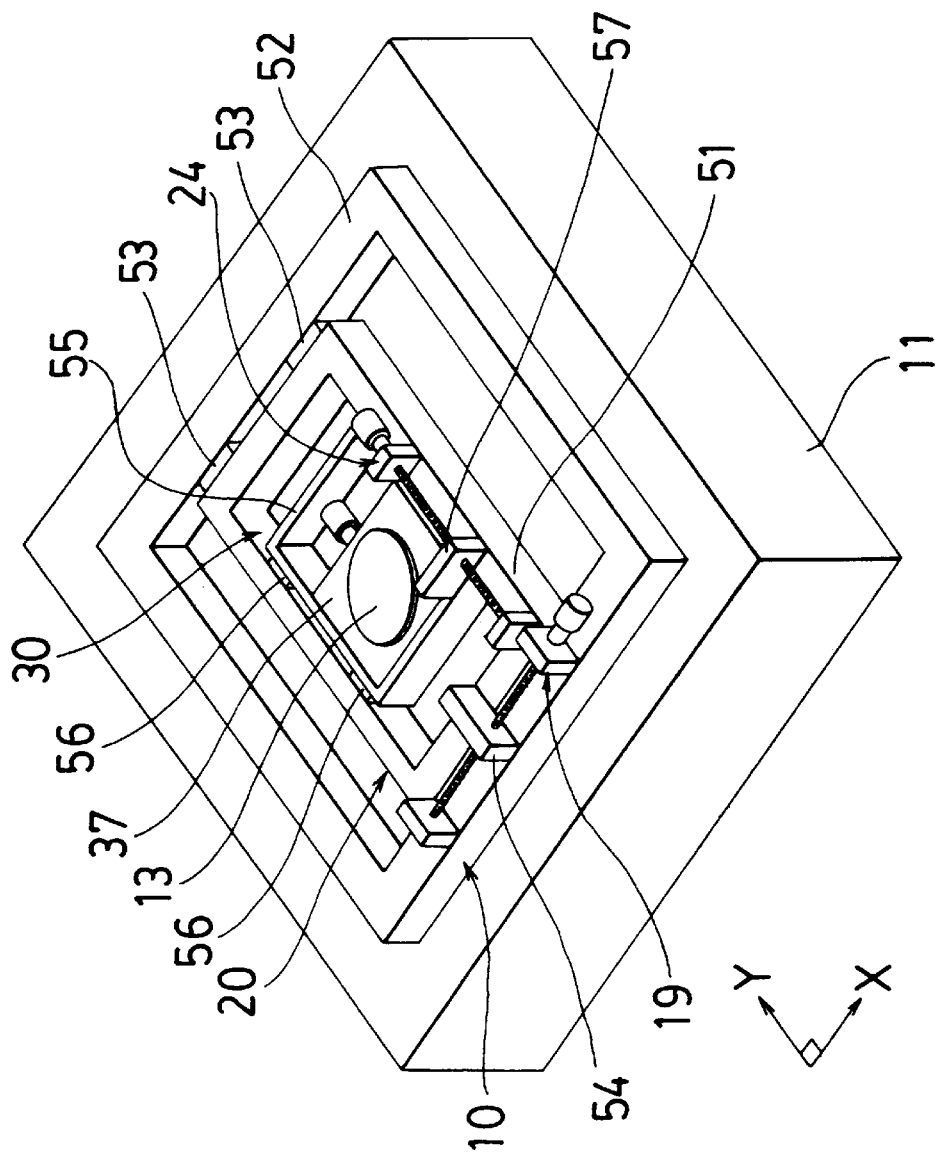
FIG. 8 is a perspective diagram showing the outside appearance of the second embodiment of the present invention.
Figure 9:
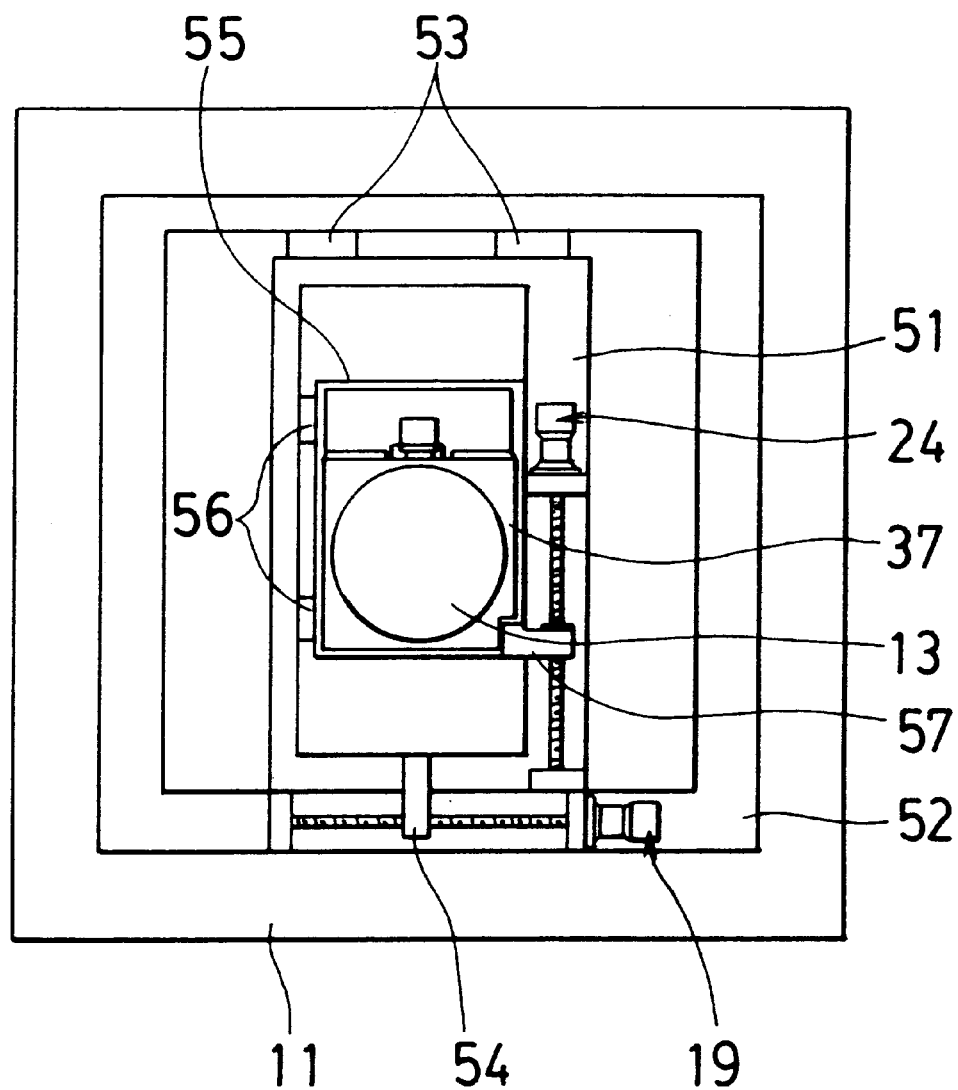
FIG. 9 is a plan view showing the stage unit of the second embodiment.
Figure 10:
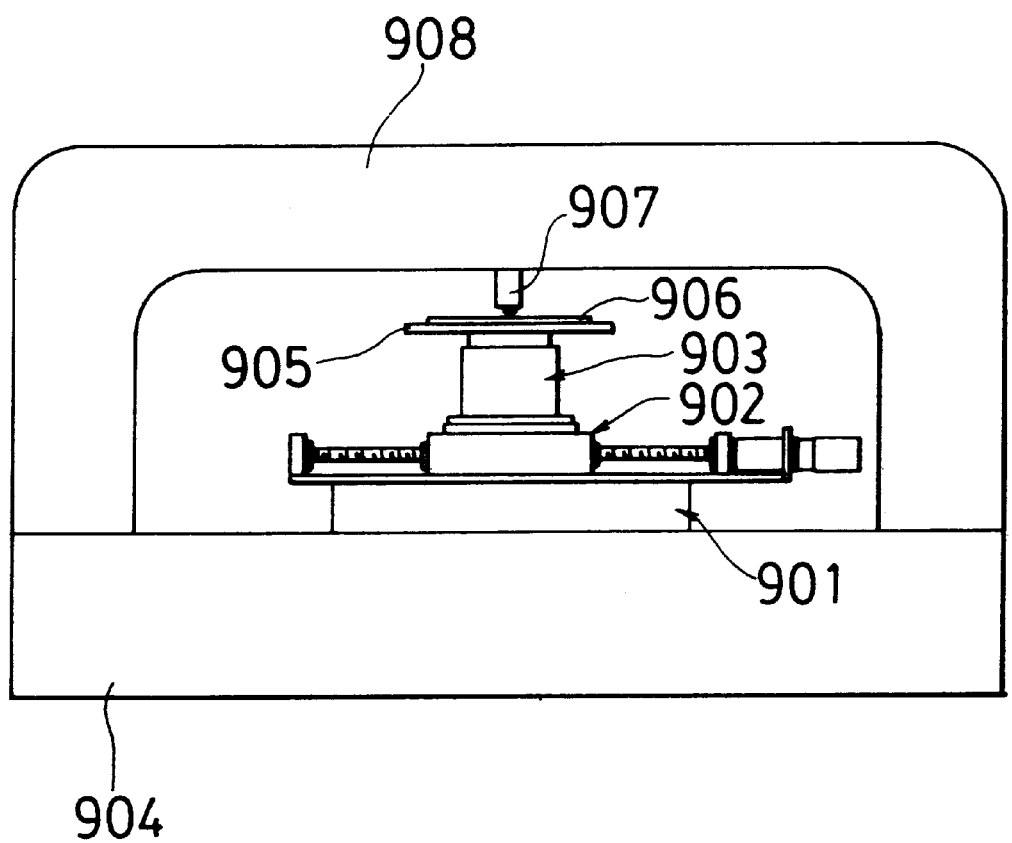
FIG. 10 is a side view showing one example of the conventional movement stage unit.

Next, the second embodiment of the movement stage unit according to the present invention will be explained with reference to FIGS. 8 and 9. FIG. 8 corresponds to FIG. 2 and FIG. 9 is a plan view. In FIGS. 8 and 9, components substantially identical to those explained in the above-mentioned first embodiment have respectively the same reference numerals.

The movement stage unit of this embodiment is also arranged on the surface table 11. The special feature of this embodiment is that a Y-axis frame 51 of the Y-axis direction stage 20 is also arranged slidably on the surface table 11. A X-axis frame 52 of the X-axis direction stage 10 has a shape of almost square and is fixed on the surface table 11. The Y-axis stage 20 is placed within the inside space of the X-axis frame 52, and the Y-axis frame 51 thereof has a shape of almost rectangular and is arranged to be slidable in the X-axis direction based on the guide due to the X-axis frame. A reference numeral 53 denotes a sliding member arranged between the X-axis frame 52 and the Y-axis frame 51. The Y-axis frame 51 is coupled to the X-axis frame 52 by causing one coupling member 54 fixed to the Y-axis frame 51 to be engaged with the X-axis direction driving section 19 arranged on the X-axis frame 52. As the coupling member 54, the plate spring explained in the first embodiment may be used.

Further, the Z-axis direction stage 30 is placed within the inside space of the Y-axis frame 51. The Z-axis direction stage 30 has a Z-axis frame 55 of rectangular shape and the bottom plate 34 at a lower position, and is arranged on the surface table 11 so as to slide in the Y-axis direction based on the guide of the Y-axis frame 51. A reference numeral 56 denotes a sliding member arranged between the Z-axis frame 55 and the Y-axis frame 51. The Z-axis frame 55 is coupled to the Y-axis frame 51 by causing one coupling member 57 fixed to the Z-axis frame 55 to be engaged with the Y-axis direction driving section 24 arranged on the Y-axis frame 51. Further the Z-axis direction stage 30 has the above-mentioned wedges-combinations mechanism 37, the driving section such as the motor 41 and the sample stand 13 in the inside space of the Z-axis frame 55. As the coupling member 57, the plate spring explained in the first embodiment may be also used.

The movement stage unit of the second embodiment has the technical effects similar to those explained in the first embodiment. Further, according to the movement stage unit of the second embodiment, the height of the movement stage unit can be decreased, because the frames 51, 52 and 53 in the X-axis, Y-axis and Z-axis direction stages 10, 20 and 30 are configured to make the structure of nested boxes and therefore their height are almost equal, and further the whole configuration of the movement stage unit can be simplified, because the rail mechanism between the X-axis and Y-axis direction stages explained in the first embodiment becomes unnecessary.

In accordance with the above-mentioned configurations of the present invention, since the whole rigidity of the movement stage unit is determined by only the rigidity of the vertical direction stage (Z-axis direction stage), it becomes very high. Further, since the ascent and descent mechanism included in the vertical direction stage utilizes a slope-contact structure formed by the wedges-combination mechanism, the high rigidity in the movement stage unit can be attained. Further, since the whole height of the movement stage unit is determined by only the height of the vertical direction stage, it can be decreased and thereby the height of the frame supporting the probe tip can be reduced, and the rigidity of the frame can be increased.

What is claimed is:

1. A stage unit used for moving a sample, which is fixed on a slide surface of a surface table, comprising:
    a sample stand on which said sample is mounted;
    a first stage for moving said sample stand in a direction perpendicular to said slide surface, which is slidably arranged on said slide surface;
    a second stage for moving said first stage in directions parallel to said slide surface, which is arranged on said slide surface; and
    coupling members for coupling said first stage with said second stage, which have strong rigidity in the directions parallel to said slide surface and weak rigidity in the direction perpendicular to said slide surface.

2. The stage unit according to claim 1, wherein said first stage comprises a wedges-combination mechanism operating as an ascent and descent mechanism.

3. The stage unit according to claim 2, wherein said wedges-combination mechanism comprises an upper wedge member on which said sample stand is arranged, and a lower wedge member which is movable in the direction parallel to said slide surface by a driving section, and said upper and lower wedge members are arranged so that their slopes face with each other.

4. The stage unit according to claim 1, wherein said second stage comprises a first-axis direction stage and a second-axis direction stage, and said first-axis direction stage is fixed on said slide surface, and further said second-axis direction stage is arranged on said first-axis direction stage so as to be movable by a rail guide mechanism and has a moving frame which is movable by another rail guide mechanism.

5. The stage unit according to claim 4, wherein said first stage is coupled with said moving frame by means of said coupling members.

6. The stage unit according to claim 1, wherein said second stage comprises a first-axis direction stage and a second-axis direction stage, and said first-axis direction stage is fixed on said slide surface, and further said second-axis direction stage is placed in an inside space of said first-axis direction stage so as to be slidable on said slide surface.

7. The stage unit according to claim 6, wherein said first stage is placed in an inside space of said second-axis direction stage so as to be slidable on said slide surface.

8. The stage unit according to claim 1, wherein a bottom plate of said first stage has an air-emitting mechanism which emits an air through nozzles formed on a lower surface of the bottom plate.

9. A scanning probe microscope comprising:
- a detecting section supported by a supporting frame and including a probe tip directed to a sample; and
- a stage unit with a sample stand on which said sample is mounted, for moving said sample so as to change a relative positional relationship between said probe tip and said sample;
- wherein said stage unit is fixed on a slide surface of a surface table, and further said stage unit comprising;
  - a first stage for moving said sample stand in a direction perpendicular to said slide surface, which is slidably arranged on said slide surface;
  - a second stage for moving said first stage in directions parallel to said slide surface, which is arranged on said slide surface; and
  - coupling members for coupling said first stage with said second stage, which have strong rigidity in the directions parallel to said slide surface and weak rigidity in the direction perpendicular to said slide surface.

10. The scanning probe microscope according to claim 9, wherein said first stage comprises a wedges-combination mechanism operating as an ascent and descent mechanism.

11. The scanning probe microscope according to claim 10, wherein said wedges-combination mechanism comprises an upper wedge member on which said sample stand is arranged, and a lower wedge member which is movable in the direction parallel to said slide surface by a driving section, and said upper and lower wedge members are arranged so that their slopes face with each other.

12. The scanning probe microscope according to claim 9, wherein said second stage comprises a first-axis direction stage and a second-axis direction stage, and said first-axis direction stage is fixed on said slide surface, and further said second-axis direction stage is arranged on said first-axis direction stage so as to be movable by a rail guide mechanism and has a moving frame which is movable by another rail guide mechanism.

13. The scanning probe microscope according to claim 12, wherein said first stage is coupled with said moving frame by means of said coupling members.

14. The scanning probe microscope according to claim 9, wherein said second stage comprises a first-axis direction stage and a second-axis direction stage, and said first-axis direction stage is fixed on said slide surface, and further said second-axis direction stage is placed in an inside space of said first-axis direction stage so as to be slidable on said slide surface.

15. The scanning probe microscope according to claim 14, wherein said first stage is placed in an inside space of said second-axis direction stage so as to be slidable on said slide surface.

16. The scanning probe microscope according to claim 9, wherein a bottom plate of said first stage has an air-emitting mechanism which emits an air through nozzles formed on a lower surface of the bottom plate.

* * * * *